(12) United States Patent
Cherepinsky et al.

(10) Patent No.: US 9,971,354 B2
(45) Date of Patent: May 15, 2018

(54) TAIL-SITTER FLIGHT MANAGEMENT SYSTEM

(71) Applicant: Sikorsky Aircraft Corporation, Stratford, CT (US)

(72) Inventors: Igor Cherepinsky, Sandy Hook, CT (US); Harshad S. Sane, Southbury, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 199 days.

(21) Appl. No.: 14/734,537

(22) Filed: Jun. 9, 2015

(65) Prior Publication Data

US 2016/0048132 A1 Feb. 18, 2016

Related U.S. Application Data

(60) Provisional application No. 62/010,103, filed on Jun. 10, 2014.

(51) Int. Cl.
| | | |
|---|---|---|
| *G05D 1/00* | (2006.01) | |
| *G05D 1/08* | (2006.01) | |
| *G06F 7/00* | (2006.01) | |
| *G06F 17/00* | (2006.01) | |
| *G05D 1/10* | (2006.01) | |
| *G08G 5/00* | (2006.01) | |

(52) U.S. Cl.
CPC ........... *G05D 1/0808* (2013.01); *G05D 1/101* (2013.01); *G08G 5/0052* (2013.01); *G08G 5/0069* (2013.01); *G08G 5/0078* (2013.01); *G08G 5/0086* (2013.01); *B64C 2201/141* (2013.01)

(58) Field of Classification Search
CPC .... G08G 5/0021; G08G 5/0052; G08G 5/025; G08G 5/003; G08G 5/0034; G08G 5/0013; G08G 5/0039; G08G 5/0086; G08G 5/0069; G08G 5/0078; G08G 5/0043; G08G 5/0047; G08G 5/0065; G08G 5/0082; G08G 5/0026; G08G 5/045; G08G 5/0008; G08G 5/006; G08G 5/04; G08G 5/065; G05B 19/00; G05B 13/04

See application file for complete search history.

(56) References Cited

U.S. PATENT DOCUMENTS

| | | | | |
|---|---|---|---|---|
| 5,086,993 A | * | 2/1992 | Wainfan | B64C 3/385 244/34 A |
| 5,289,994 A | * | 3/1994 | Del Campo Aguilera | B64C 27/22 244/12.1 |

(Continued)

FOREIGN PATENT DOCUMENTS

WO 2013048339 A1 4/2013

*Primary Examiner* — Anne M Antonucci
*Assistant Examiner* — Kenny A. Taveras
(74) *Attorney, Agent, or Firm* — Cantor Colburn LLP

(57) ABSTRACT

A system and method for controlling flight of an aircraft having a propeller, memory and a processor includes receiving one or more signals indicative of a flight plan comprising a plurality of waypoints; determining information indicative of a trajectory between the plurality of waypoints; determining information indicative of vehicle attitude commands; determining information indicative of flight control command signals; and determining an error between sensed vehicle states and the vehicle attitude commands.

15 Claims, 2 Drawing Sheets

(56) References Cited

U.S. PATENT DOCUMENTS

| Patent/Publication | Date | Inventor | Classification |
|---|---|---|---|
| 6,478,262 B1* | 11/2002 | Kinkead | B64C 27/20 244/17.13 |
| 7,506,837 B2* | 3/2009 | Parks | B64C 3/385 244/7 B |
| 8,415,596 B2* | 4/2013 | Dold | F41G 7/007 244/3.1 |
| 8,515,596 B2 | 8/2013 | Hamke et al. | |
| 2003/0057331 A1* | 3/2003 | Kinkead | G05D 1/102 244/194 |
| 2007/0023582 A1* | 2/2007 | Steele | B64C 39/024 244/190 |
| 2007/0179685 A1* | 8/2007 | Milam | G01C 21/00 701/3 |
| 2011/0001001 A1* | 1/2011 | Bryant | B64C 29/0033 244/12.5 |
| 2011/0184593 A1* | 7/2011 | Swope | G05D 1/101 701/12 |
| 2011/0295569 A1* | 12/2011 | Hamke | G01P 7/00 703/2 |
| 2012/0199698 A1* | 8/2012 | Thomasson | B64C 39/024 244/175 |
| 2012/0286102 A1 | 11/2012 | Sinha et al. | |
| 2013/0206921 A1* | 8/2013 | Paduano | B64C 13/16 244/7 C |
| 2014/0158815 A1* | 6/2014 | Renteria | B64C 29/0025 244/12.1 |
| 2015/0014475 A1* | 1/2015 | Taylor | B64C 39/024 244/6 |
| 2015/0286214 A1* | 10/2015 | Litwinowicz | G05D 1/0055 701/3 |
| 2016/0046369 A1* | 2/2016 | Watkins | B64C 5/02 244/7 A |
| 2016/0048132 A1* | 2/2016 | Cherepinsky | G05D 1/0808 701/4 |
| 2016/0125746 A1* | 5/2016 | Kunzi | G05D 1/0088 701/11 |
| 2016/0200436 A1* | 7/2016 | North | B64C 29/0033 244/7 R |
| 2017/0021923 A1* | 1/2017 | Fisher | B64C 29/02 |

* cited by examiner

TAIL-SITTER FLIGHT MANAGEMENT SYSTEM

CROSS-REFERENCE TO RELATED APPLICATIONS

This application claims the benefit of U.S. provisional patent application Ser. No. 62/010,103, filed Jun. 10, 2014, the entire contents of which are incorporated herein by reference.

BACKGROUND

The subject matter disclosed herein relates generally to the field of autonomous tail-sitter vehicles and, more particularly, to a flight-management architecture for an unmanned aerial tail-sitter aircraft that autonomously transitions between flight-states.

DESCRIPTION OF RELATED ART

Unmanned aerial vehicles (UAV's), for example, fixed-wing and rotorcraft UAV's, are powered aircraft without a human operator. Autonomous UAV's are a natural extension of UAV's and do not require real-time control by a human operator and may be required to land on an unprepared site or unknown terrain without human assistance during mission operation or in an emergency. In a UAV "tail-sitter" vertical takeoff and landing (VTOL) aircraft, the fuselage is vertical during takeoff and must transition from a vertical flight state (i.e. rotor-borne) to a horizontal flight state (i.e., wing-borne) and back. These autonomous UAV tail-sitter aircraft must go through these transition states several times during mission operation. Current art on autonomous transition between flight-states has focused on feedback control involving a complex set of transition logic and multiple control loops in order to manage highly varying vehicle dynamics during transition. The prior art multiple control approach includes classical-control, feedback linearization, model predictive control and the like. However, this multiple control approach utilizes a coupled non-linear feedback controller that is not sufficient for analysis, certification or test. A flight-management architecture that automatically transitions between rotor-borne and wing-borne flight-states for an autonomous UAV tail-sitter aircraft is desired.

BRIEF SUMMARY

According to an aspect of the invention, a method for controlling flight of an aircraft includes receiving one or more signals indicative of a flight plan comprising a plurality of waypoints; determining information indicative of a trajectory between the plurality of waypoints; determining information indicative of vehicle attitude commands; determining information indicative of flight control command signals; and determining, with the processor via a sensor, signals indicative of an error between sensed vehicle states and the vehicle attitude commands.

In addition to one or more of the features described above, or as an alternative, further embodiments could include providing the aircraft with an adjustment solution indicative of an adjusted flight control command signal in response to the determining of the error signal.

In addition to one or more of the features described above, or as an alternative, further embodiments could include determining at least one of an aircraft velocity, aircraft attitude and aircraft position.

In addition to one or more of the features described above, or as an alternative, further embodiments could include receiving sensor information related to a deviation of the aircraft from the trajectory.

In addition to one or more of the features described above, or as an alternative, further embodiments could include determining a transition trajectory in response to the receiving of the information related to a deviation.

In addition to one or more of the features described above, or as an alternative, further embodiments could include receiving signals indicative of data from real-time terrain and obstacle sensors.

In addition to one or more of the features described above, or as an alternative, further embodiments could include determining the vehicle attitude commands based on based on the trajectory and location of the aircraft.

In addition to one or more of the features described above, or as an alternative, further embodiments could include determining desired vehicle attitude control commands configured to displace servos and linkages on the aircraft.

In addition to one or more of the features described above, or as an alternative, further embodiments could include determining the trajectory based on in-flight configurations or constraints of the aircraft.

In addition to one or more of the features described above, or as an alternative, further embodiments could include each waypoint comprises at least one of a location, a point of interest, a target, and a specific set of coordinates.

In addition to one or more of the features described above, or as an alternative, further embodiments could include implementing a Rapidly-exploring Random Tree.

According to another aspect of the invention, a system for controlling flight of an aircraft includes an aircraft with a propeller having a plurality of blades, where the propeller is associated with a sensor; a processor; and memory having instructions stored thereon that, when executed by the processor, cause the system to: receive one or more signals indicative of a flight plan comprising a plurality of waypoints; determine information indicative of a trajectory between the plurality of waypoints; determine information indicative of vehicle attitude commands; determine information indicative of flight control command signals; and determine an error between sensed vehicle states and the vehicle attitude commands.

In addition to one or more of the features described above, or as an alternative, further embodiments could include a processor that is configured to provide the aircraft with an adjustment solution indicative of an adjusted flight control command signal in response to the determining of the error signal.

In addition to one or more of the features described above, or as an alternative, further embodiments could include a processor that is configured to receive sensor information related to a deviation of the aircraft from the trajectory and determine a transition trajectory in response to the receiving of the sensor information related to a deviation.

In addition to one or more of the features described above, or as an alternative, further embodiments could include a processor that is configured to determine at least one of an aircraft velocity, aircraft attitude and aircraft position.

In addition to one or more of the features described above, or as an alternative, further embodiments could include a processor that is configured to receive signals indicative of data from real-time terrain and obstacle sensors.

In addition to one or more of the features described above, or as an alternative, further embodiments could include a processor that is configured to determine the vehicle attitude commands based on based on the trajectory and location of the aircraft.

In addition to one or more of the features described above, or as an alternative, further embodiments could include a processor that is configured to determine desired vehicle attitude control commands configured to displace servos and linkages on the aircraft.

In addition to one or more of the features described above, or as an alternative, further embodiments could include a processor that is configured to determine the trajectory based on in-flight configurations or constraints of the aircraft.

In addition to one or more of the features described above, or as an alternative, further embodiments could a waypoint that comprises at least one of a location, a point of interest, a target, and a specific set of coordinates.

In addition to one or more of the features described above, or as an alternative, further embodiments could include a processor that is configured to determine the trajectory through a Rapidly-exploring Random Tree.

Other aspects, features, and techniques of the invention will become more apparent from the following description taken in conjunction with the drawings.

BRIEF DESCRIPTION OF THE SEVERAL VIEWS OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which like elements are numbered alike in the several FIGURES:

DETAILED DESCRIPTION

Embodiments of a system and method for an autonomous flight transition algorithm for an autonomous UAV tail-sitter aircraft includes a propeller and a processor that receives signals indicative of a flight plan having a plurality of waypoints and determines a trajectory between the plurality of waypoints. These waypoints include velocity and desired attitude of the vehicle at specified positions in the planning space. Also, vehicle attitude commands and flight control command signals are determined. Further, an error value between the vehicle attitude commands and the flight control command signals are determined.

Figure 1:
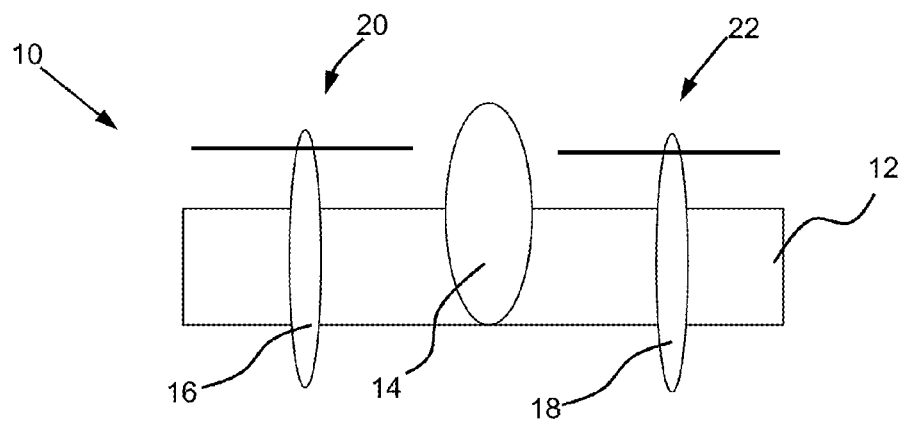
FIG. 1 is a perspective view of an exemplary autonomous tail-sitter vehicle according to an embodiment of the invention.

Referring now to the drawings, FIG. 1 illustrates a perspective of an exemplary vehicle in the form of an autonomous tail-sitter unmanned aerial vehicle (UAV) 10 (or "autonomous tail-sitter vehicle 10") for implementing a flight transition algorithm according to an embodiment of the invention. As illustrated, the autonomous tail-sitter vehicle 10 is shown in a vertical take-off and landing orientation whereby the fuselage 14 is vertically oriented with respect to the ground during takeoff and landing. The autonomous tail-sitter vehicle 10 includes an elongated wing structure 12 that is configured to provide lift when the autonomous tail-sitter 10 is in horizontal flight (i.e., wing-born flight state). The autonomous tail-sitter vehicle 10 includes a fuselage 12 that is located in the middle of the wing structure 12. A plurality of propellers 16, 18 is mounted to the wing structure 12 and includes respective propeller blade assemblies 20, 22. The propellers 16, 18 provide thrust during takeoff and landing and during horizontal flight. Although a particular configuration of an autonomous tail-sitter vehicle 10 is illustrated and described in the disclosed embodiments, it will be appreciated that other configurations and/or machines include autonomous and semi-autonomous VTOL aircraft that may operate in land or water including fixed-wing aircraft, tail-sitting ducted fan VTOL aircraft, including micro air-vehicle or organic air-vehicle may also benefit from embodiments disclosed.

Figure 2:
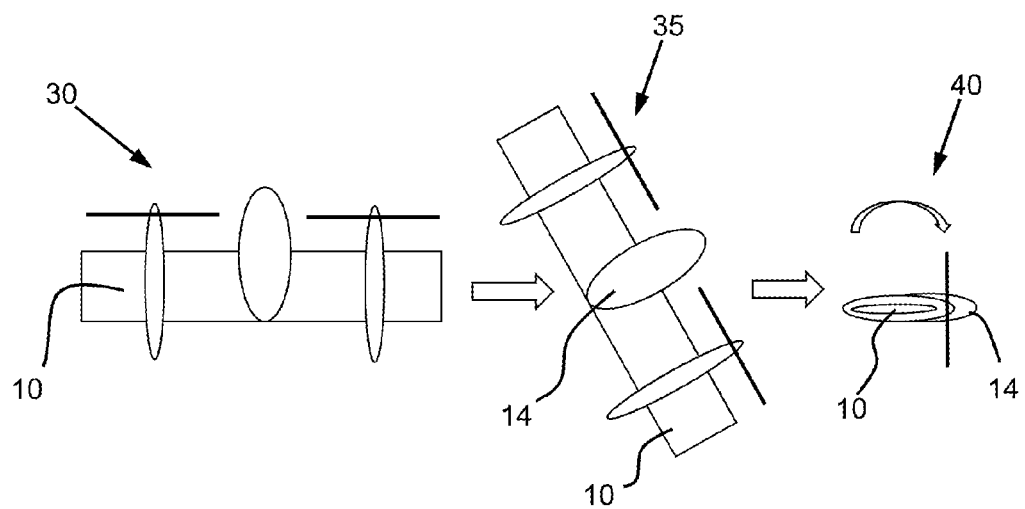
FIG. 2 is a schematic view of autonomous tail-sitter vehicle that is shown in transition from a rotor-borne state to a wing-borne state according to an embodiment of the invention.

FIG. 2 illustrates an exemplary view of an autonomous tail-sitter vehicle 10 that is shown transitioning from a rotor-borne flight state 30 to a wing-borne flight state 40 according to an exemplary embodiment of the invention. In the rotor-borne flight state 30, the propeller blade assemblies 20, 22 and wing structure 12 are adjusted to provide lift due to the increase in the throttle of the propellers 16, 18 and vertically launch the autonomous tail-sitter vehicle 10. During launch, the propellers 16, 18 function as rotors to provide lift to the autonomous tail-sitter vehicle 10. Once a predetermined height, e.g., a safety clearance and speed is achieved, a stall speed or above is achieved, or if the autonomous tail-sitter vehicle 10 is at approaching a prescribed location in a mission space, the autonomous tail-sitter vehicle 10 starts to transition to an intermediate vehicle-state 35. As the autonomous tail-sitter vehicle 10 continues transitioning, the angle of attack of the wing structure 12 and throttle of the propellers 16, 18 may be adjusted to cause the fuselage 14 to pitch down and yaw. As the autonomous tail-sitter vehicle 10 continues to pitch and roll, it completes the transition to a wing-borne flight state 40 whereby the fuselage 14 is substantially horizontal and the propellers 16, 18 provide thrust to propel the autonomous tail-sitter vehicle 10.

Figure 3:
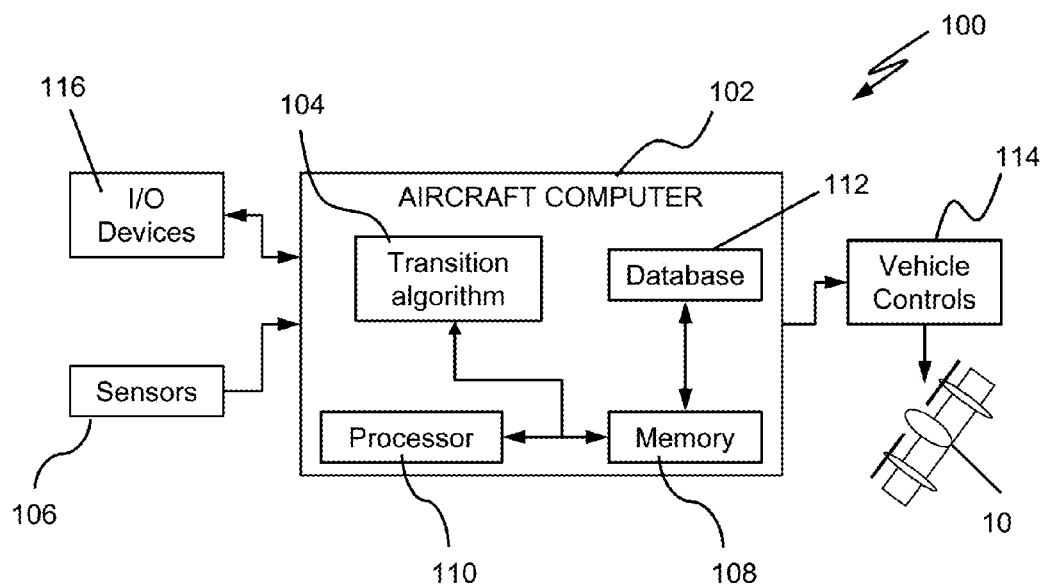
FIG. 3 is a schematic view of a an exemplary computing system according to an embodiment of the invention.

FIG. 3 illustrates a schematic block diagram of a path planner system 100 on board the autonomous tail-sitter vehicle 10 according to an exemplary embodiment. As illustrated, the path planner 100 includes the aircraft computer 102 that executes instructions for implementing the flight transition algorithm 104. The aircraft computer 102 may receive real-time information acquired from sensors 106, e.g., LIght Detection And Ranging (LIDAR), Radio Detection And Ranging (RADAR), gyroscopes, accelerometers, or an inertial management unit (IMU) that may be used to acquire positional data related to a current geographical location. Additional navigation systems such as global positioning systems (GPS) or the like may be provided to enhance the positional awareness of autonomous tail-sitter vehicle 10. The computer 102 includes a memory 108 that communicates with a processor 110. The memory 108 may store the flight transition algorithm 104 as executable instructions that are executed by processor 110. The instructions may be stored or organized in any manner and at any level of abstraction, such as in connection with the execution of the flight transition algorithm 104. The processor 110 may be any type of processor (such as a central processing unit (CPU) or a graphics processing unit (GPU)), including a general purpose processor, a digital signal processor, a microcontroller, an application specific integrated circuit, a field programmable gate array, or the like. Also, in embodiments, memory 108 may include random access memory (RAM), read only memory (ROM), or other electronic, optical, magnetic or any other computer readable medium onto which is stored the mixing algorithm described below.

The system 100 may include a database 112. The database 112 may be used to store terrain and obstacle information on which the path planner 100 operates. The path planner 100 may also operate on real time data acquired by sensors 106 such as, e.g., a LIDAR scanner, RADAR or other terrain and obstacle perception sensors. Also, sensor data acquired by, sensors 106 may be stored in database 112. The data stored in the database 112 may be based on one or more other algorithms or processes for implementing flight transition algorithm 104. For example, in some embodiments data stored in the database 112 may be a result of the processor 110 having subjected data received from the sensors 106 to one or more filtration processes. The database 112 may be used for any number of reasons. For example, the database 112 may be used to temporarily or permanently store data, to provide a record or log of the data stored therein for subsequent examination or analysis, etc. In some embodiments, the database 112 may store a relationship between data, such as one or more links between data or sets of data acquired on board autonomous tail-sitter vehicle 10.

The system 100 may provide one or more controls, such as vehicle controls 114. The vehicle controls 114 may provide directives based on, e.g., a flight plan comprising a plurality of waypoints. Directives provided by the vehicle controls 114 may include navigating the autonomous tail-sitter vehicle 10 to various waypoints. The directives may be presented on one or more input/output (I/O) devices 116. The I/O devices 116 may include a display device or screen, audio speakers, a graphical user interface (GUI), etc. In some embodiments, the I/O devices 116 may be used to enter or adjust a linking between data or sets of data. It is to be appreciated that the system 100 is illustrative. In some embodiments, additional components or entities not shown in FIG. 3 may be included. In some embodiments, one or more of the components or entities may be optional. In some embodiments, the components or entities of the system 100 may be arranged or configured differently from what is shown in FIG. 3. For example, in some embodiments the I/O device(s) 116 may be commanded by vehicle controls 114, as opposed to being commanded by processor 110 as shown in FIG. 3.

Figure 4:
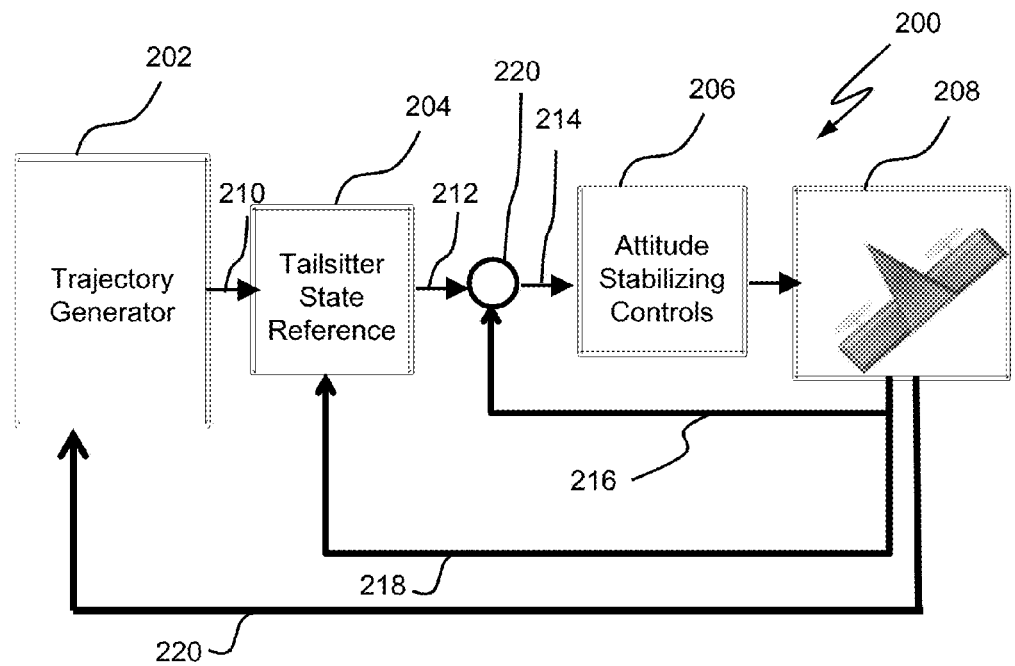
FIG. 4 illustrates a data flow diagram for a flight-management architecture that autonomously transitions between vehicle-states according to an embodiment of the invention.

FIG. 4 illustrates an exemplary data flow diagram 200 that is performed by processor 110 for implementing the flight transition algorithm 104 according to an embodiment of the invention. Particularly, data flow diagram 200 depicts flight-management architecture for autonomously managing flight transitions between a rotor-borne vehicle state and a wing-borne vehicle state in a mission space for the autonomous tail-sitter vehicle 10. The flight-management architecture includes a plurality of modules including a trajectory generator module 202, a state-reference generator module 204 and an attitude controller module 206.

Initially, the trajectory generator module 202 autonomously determines an optimal/feasible trajectory based on command and control information (e.g., a flight plan and/or flight instructions) that is stored on autonomous tail-sitter vehicle 10 or is received from a ground control station and/or from a field user in communication with the autonomous tail-sitter vehicle 10. The flight instructions instruct the autonomous tail-sitter vehicle 10 to fly between a number of waypoints in a series of mission locations, e.g., locations A, B and C, in a mission space. A waypoint may be any point specified to the autonomous tail-sitter vehicle 10. For instance, a waypoint may be, without limitation, a location, a point of interest, a target, a specific set of coordinates (e.g., latitude and longitude) and/or a desired velocity and attitude of vehicle 10 at a specific set of coordinates. The trajectory generator module 202 determines an optimal trajectory for position, velocity and vehicle attitude states between a prescribed set of waypoints for the autonomous tail-sitter vehicle 10 in order to transition between the prescribed set of waypoints in the mission space. The optimal trajectory may be based on in-flight configurations and/or constraints of the autonomous tail-sitter vehicle 10. Exemplary in-flight configurations can include minimizing fuel, minimizing time or the like. As the vehicle executes the specified transition, the trajectory generator module 202 may use feedback 220 from the vehicle flight control command signals 208 to regenerate a transition trajectory starting from the changing vehicle position. This may be necessary as aircraft sensors 106 and I/O devices 116 (FIG. 3) provide new information if the vehicle deviates excessively from the previously computed trajectory. In an embodiment, the trajectory generator module 202 utilizes a path planning algorithm such as, e.g., a Rapidly-exploring Random Tree (RRT) methodology in order to plan a path to the target based on an apriori map or data from real-time terrain and obstacle sensors such as LIDAR or RADAR. RRT algorithm generates paths by sampling the state-space around the start and goal states, and connecting these states with dynamically feasible trajectory fragments in a tree-structure. Paths are generated by the RRT method and evaluated by the system 200 in order to determine a path that optimizes a given criteria (e.g., the amount of time or quantity of fuel over vehicle attitude/state). In an embodiment, a traditional non-linear-optimization-based algorithm may be used in lieu of a RRT methodology for determining the optimal trajectory. The trajectory generator module 202 sends the optimal trajectory as a trajectory command on line 210 to a state reference generator module 204 for generation of a vehicle attitude command (i.e., vehicle state reference command).

State reference generator module 204 receives the trajectory command on line 201 and determines vehicle attitude commands (or vehicle-state reference commands) on line 212 based on the optimal trajectory and location of the autonomous tail-sitter vehicle 10 in relation to that optimal trajectory. The state reference generator module 204 determines vehicle attitude commands such as, e.g., desired vehicle states, acceleration rate commands, velocity commands and the like in order to converge and stay on the optimal trajectory. In an example, the state reference generator module 204 utilizes vehicle position, angular rate, and acceleration rate or the like together with the optimal trajectory in order to determine vehicle attitude commands for implementation on autonomous tail-sitter vehicle 10. Vehicle attitude commands are sent to an attitude controller module 206 on line 214 in order to generate actual flight control command signals 208 required for flight augmentation of the autonomous tail-sitter vehicle 10. This includes desired vehicle attitude control commands to the rotor elements and flaps/slats in order to displace servos and linkages for traversing the optimal trajectory and transitioning between vehicle states along this trajectory. Attitude controller module 206 executes control laws to provide both control and stability of the vehicle controls 114 (FIG. 3). In attitude controller module 206, desired vehicle attitude commands are shaped directly into desired aircraft responses that are implemented as control commands in block 208 required to produce the desired response by displacing actuators and flaps/slats on autonomous tail-sitter vehicle 10. The difference between the desired vehicle attitude commands and the response of autonomous tail-sitter vehicle 10 is sensed and fed back as sensed vehicle states on line 216 to a summation module 220 and to state reference generator module 204 in order minimize the error between sensed vehicle states and vehicle-state reference commands (vehicle attitude commands). The sensed parameter signals from sensors 106 indicative of vehicle states are fed back in order to determine an adjustment solution to the block 208 and drive errors towards zero thereby producing the desired vehicle response.

The terminology used herein is for the purpose of describing particular embodiments only and is not intended to be limiting of the invention. While the description of the present invention has been presented for purposes of illustration and description, it is not intended to be exhaustive or limited to the invention in the form disclosed. Many modifications, variations, alterations, substitutions or equivalent arrangement not hereto described will be apparent to those of ordinary skill in the art without departing from the scope and spirit of the invention. Additionally, while the various embodiment of the invention have been described, it is to be understood that aspects of the invention may include only some of the described embodiments. Accordingly, the invention is not to be seen as limited by the foregoing description, but is only limited by the scope of the appended claims.

What is claimed is:

1. A method for controlling flight of an autonomous tail-sitter aircraft through a flight transition, comprising:
   receiving, with a processor, one or more signals indicative of a flight plan comprising a plurality of waypoints along the flight transition;
   determining, with a first module, a trajectory between the plurality of waypoints;
   determining, with a second module, vehicle attitude commands for the trajectory;
   determining, with controller third module, flight control command signals for the information indicative of vehicle attitude commands;
   implementing the flight control command signals at the aircraft to control the flight of the aircraft through the flight transition from a rotor-borne flight state in which a propeller of the aircraft provides lift to the aircraft in a vertical orientation of the aircraft to the wing-borne flight state in which the propeller provides a forward thrust to the aircraft in a horizontal orientation of the aircraft;
   determining via a sensor, a difference between the vehicle attitude commands and a response of the aircraft; and
   providing the difference as input to the second module and as input to the third module to reduce the difference to traverse the trajectory.

2. The method of claim 1, wherein determining the difference between the vehicle attitude commands and the response of the aircraft further comprises determining signals indicative of an error between sensed vehicle states and the vehicle attitude commands.

3. The method of claim 1, wherein the determining the trajectory further comprises determining at least one of an aircraft velocity, aircraft attitude, and aircraft position.

4. The method of claim 1, further comprising:
   receiving sensor information related to a deviation of the aircraft from the trajectory; and
   determining a transition trajectory in response to the receiving of the information related to a deviation.

5. The method of claim 1, wherein the determining the trajectory further comprises receiving signals indicative of data from real-time terrain and obstacle sensors.

6. The method of claim 1, further comprising determining the vehicle attitude commands based on the trajectory and location of the aircraft.

7. The method of claim 1, wherein the determining the flight control command signals further comprises determining desired vehicle attitude control commands that are configured to displace servos and linkages on the aircraft.

8. The method of claim 1, further comprising determining the trajectory based on in-flight configurations or constraints of the aircraft.

9. A system for controlling flight of an autonomous tail-sitter aircraft through a flight transition, comprising:
   a propeller for rotor-borne flight of the aircraft;
   a wing for wing-borne flight of the aircraft
   a processor; and
   memory having instructions stored thereon that, when executed by the processor, cause the system to:
   receive one or more signals indicative of a flight plan comprising a plurality of waypoints along a flight transition;
   determine information a trajectory between the plurality of waypoints using a first module;
   determine vehicle attitude commands for the trajectory at a second module;
   determine flight control command signals for the vehicle attitude commands at a third module;
   implement the flight control command signals at the aircraft to control the flight of the aircraft through the flight transition from the rotor-borne flight state in which a propeller of the aircraft provides lift to the aircraft in a vertical orientation of the aircraft to the wing-borne flight state which the propeller provides a forward thrust to the aircraft in a horizontal orientation of the aircraft; and
   determine a difference between the vehicle attitude commands and a response of the aircraft; and
   provide the difference as input to the second module and as input to the third module to reduce the difference to traverse the trajectory.

10. The system of claim 9, wherein the processor is configured to determine the difference between the vehicle attitude commands and the response of the aircraft by determining an error between sensed vehicle states and the vehicle attitude commands.

11. The system of claim 9, wherein the processor is configured to receive sensor information related to a deviation of the aircraft from the trajectory and determine a transition trajectory in response to the receiving of the sensor information related to a deviation.

12. The system of claim 9, wherein the processor is configured to determine at least one of an aircraft velocity, aircraft attitude, and aircraft position.

13. The system of claim 9, wherein the processor is configured to receive signals indicative of data from real-time terrain and obstacle sensors.

14. The system of claim 9, wherein the processor is configured to determine the vehicle attitude commands based on the trajectory and location of the aircraft.

15. The system of claim 9, wherein the processor is configured to determine desired vehicle attitude control commands that are configured to displace servos and linkages on the aircraft.

* * * * *